United States Patent [19]
Jean

[11] Patent Number: 4,944,113
[45] Date of Patent: Jul. 31, 1990

[54] FISHING FLOAT

[76] Inventor: Lisa Jean, No. 29, Yu Jen St., Wu Feng Hsiang, Taichung Hsien, Taiwan

[21] Appl. No.: 448,353

[22] Filed: Dec. 11, 1989

[51] Int. Cl.$^5$ ............................................. A01K 93/00
[52] U.S. Cl. ................................................. 43/43.14
[58] Field of Search ................. 43/43.14, 42.22, 44.92

[56] References Cited

U.S. PATENT DOCUMENTS

| | | | |
|---|---|---|---|
| 3,010,244 | 11/1961 | Mattingly | 43/43.14 |
| 3,337,981 | 8/1967 | Bowman | 43/43.14 |
| 3,990,172 | 11/1976 | Hagquist | 43/43.14 |

FOREIGN PATENT DOCUMENTS

| | | | |
|---|---|---|---|
| 719373 | 11/1931 | France | 43/44.92 |
| 20443 | of 1891 | United Kingdom | 43/43.14 |
| 605913 | 8/1948 | United Kingdom | 43/43.14 |
| 2172481 | 9/1986 | United Kingdom | 43/43.14 |

Primary Examiner—M. Jordan
Attorney, Agent, or Firm—Zarley McKee, Thomte, Voorhees & Sease

[57] ABSTRACT

A fishing float comprising a spindle at an upper portion, a bob consisting of an inner shell enclosed by an outer shell at a middle portion and a tail at a lower portion. The inner shell is extensible with respect to the outer shell and thus an adjustable airtight space is formed. Meanshile, the inner shell and the tail are formed of a spiraled plastic strip which provides good flexiblity to endure an accidental impact or bending force.

2 Claims, 5 Drawing Sheets

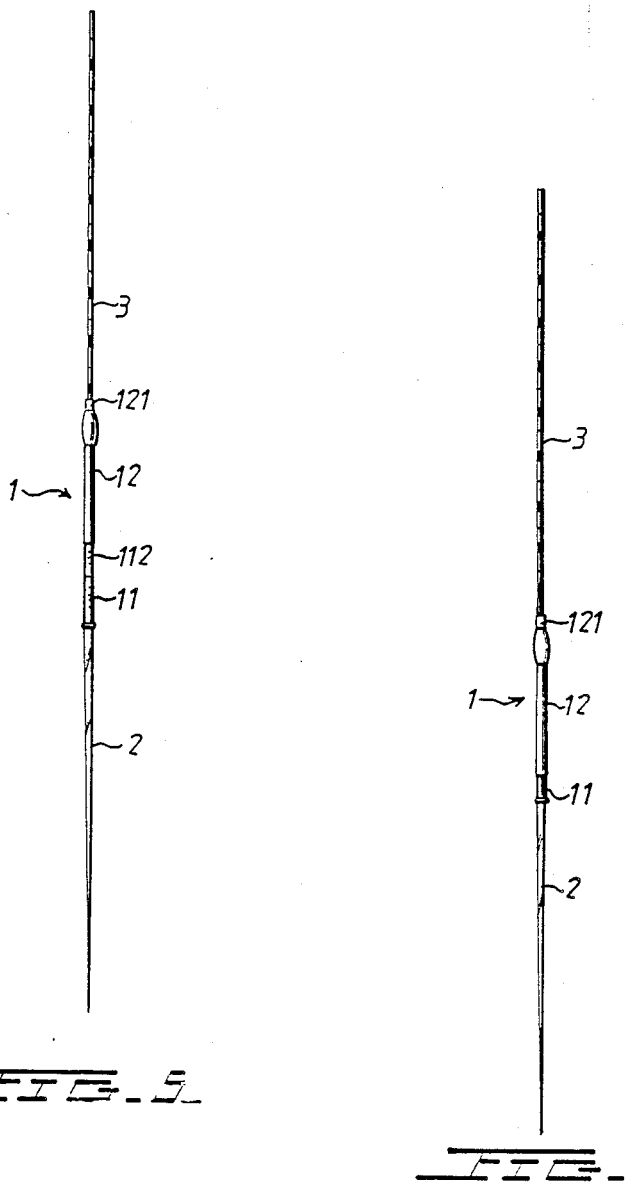

FISHING FLOAT

BACKGROUND OF THE INVENTION

The present invention relates to a fishing float and more particularly to a fishing float that has a adjustable buoyancy.

A conventional fishing float is usually hollow and made from either wood or plastic. The wooden float, which has little resilience and the plastic float, which may have an uneven thickness due to the blow moulding process, are easily broken due to impact or bending.

The conventional wooden float or plastic float is usually quite heavy and thus the float may not be easily seen above the water's surface due to its low buoyancy making it in the water. The conventional fishing float has an airtight space within itself which is a constant capacity and can only be used for fishing at one level in the water only. It is not possible to fish with the float at different level in the water.

The present invention has arisen in order to mitigate and/or obviate the above-mentioned drawbacks in the manner set forth in the detailed description of the preferred embodiment.

SUMMARY OF THE INVENTION

It is a primary objective of the present invention to provide a fishing float having an adjustable airtight space therein.

A further objective of the present invention is to provide a fishing float which has a lighter weight and a stronger structure in comparison with the prior art.

These and additional objectives, if not set forth specifically herein, will be readily apparent to those skilled in the art from the detailed description provided hereinbelow, with appropriate reference to the accompanying drawings.

BRIEF DESCRIPTION OF THE DRAWING

FIG. 5 is a view of the fishing float in accordance with the present invention, wherein the fishing foat is in an extended condition; and FIG. 6 is a view of the fishing float in accordance with the present invention, wherein the fishing float is in a retracted condition.

DETAILED DESCRIPTION OF THE PREFERRED EMBODIMENT

Figure 1:
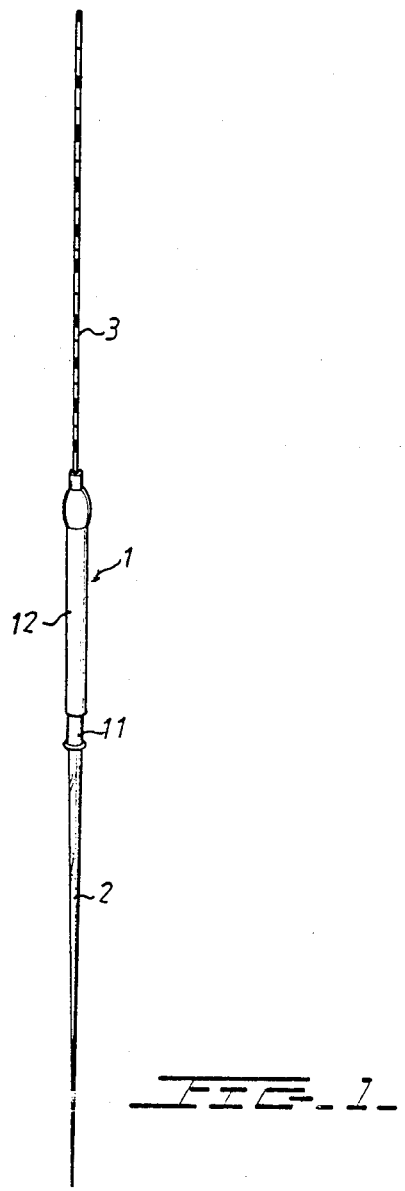
FIG. 1 is a perspective view of a fishing float in accordance with the present invention.

Referring to FIG. 1, it can be seen that the preferred embodiment of a fishing float in accordance with the present invention comprises a spindle 3 at an upper portion, a bob 1 at a middle portion and a tail 2 at a lower portion thereof.

Figure 2:
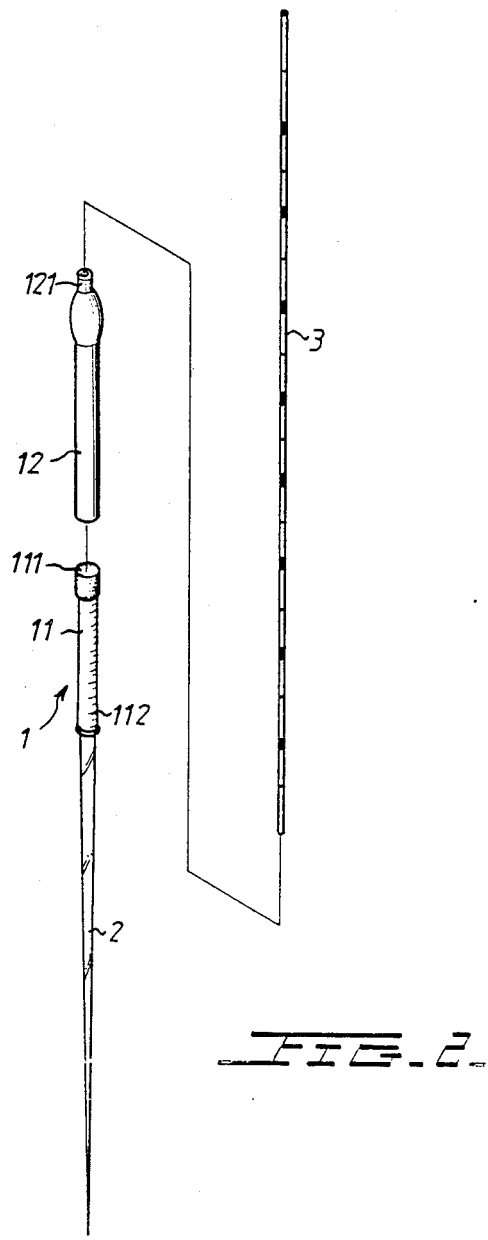
FIG. 2 is an exploded view of the fishing float in accordance with the present invention as shown in FIG. 1.
Figure 3:
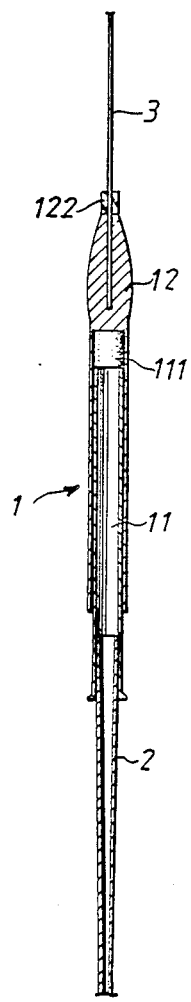
FIG. 3 is a cross-sectional view of the fishing float in accordance with the present invention as shown in FIG. 1.

Further referring to FIGS. 2 and 3, an exploded view and a cross-sectional view of the fishing float as seen in FIG. 1 are shown respectively.

The bob 1 consists of a hollow inner shell 11 enclosed by a hollow outer shell 12. The outer shell 12 is a substantially hollow cylindrical shape with a bulbous section on a top portion thereof. A small opening 121 projects from a top of the outer shell 12 within which is fitted a rubber grommet 122 for receiving a lower end of the spindle 3 therein and having a supplementary function of preventing the permeation of water into the bob 1.

The inner shell 11 is a substantially cylindrical shape with an outer dimeter slightly less than an inner diameter of the outer shell 12. The inner shell 11 is inserted in an opening at the lower end of the outer shell 12 and is extensible with respect to the outer shell 12. Provided on the top end of the inner shell 11 is a circular rubber plug 111 which closely contacts with an inner surface of the outer shell 12 and provides a snug water tight fit.

An airtight space is thus formed within the outer shell 12 and isolated by the rubber plug 111 and the rubber grommet 122. The capacity of the airtight space is adjustable by way of pushing or pulling the inner shell 11 respectively in or out of the outer shell 12. The larger the airtight space is, the greater the buoyancy of the fishing float. This is the reason why the float is capable of floating at different levels for fishing in the water or maintaining the same level when suspending varying weights underneath it.

A scale 112 is provided on an outer surface of the inner shell 11 as an indicator of the size of the airtight space. The tail 2 is attached to a lower end of the inner shell 11 and is substantially an elongated cone shape.

Figure 4:
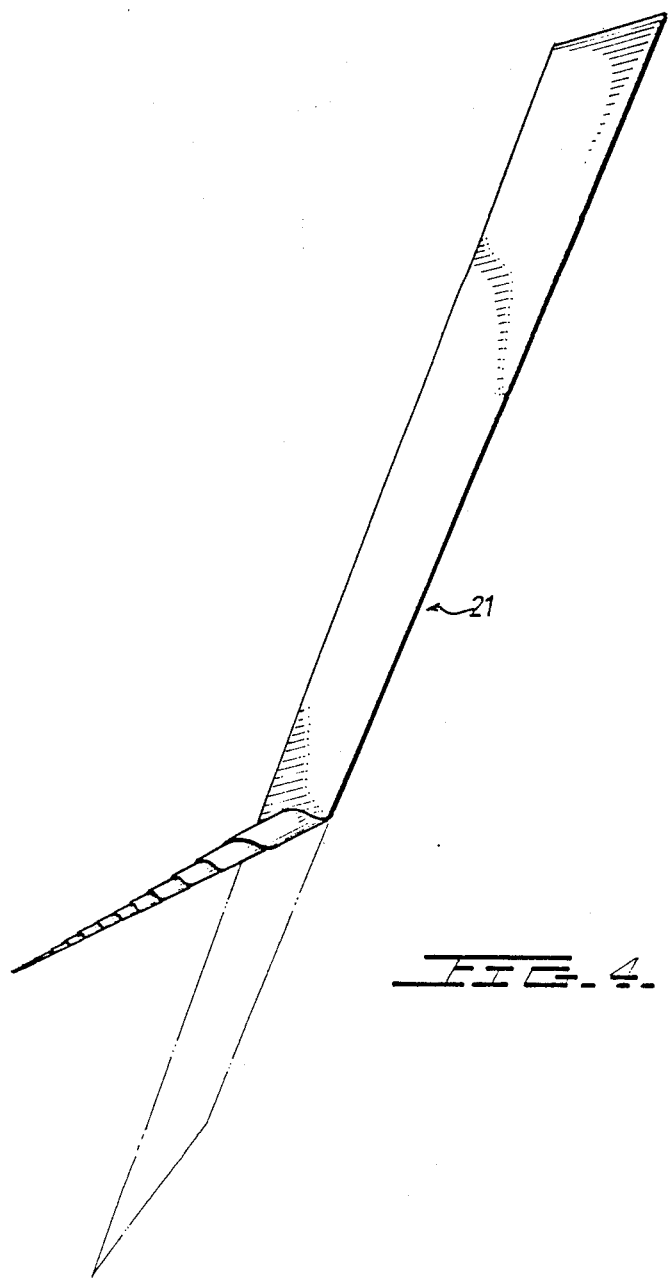
FIG. 4 is a view of the manner of construction of a float tail in accordance with the present invention.

FIG. 4 illustrates a view of the manner of construction of the tail 2. A thin tapering plastic strip 21 is firstly spiraled and then dipped into hot water so as to soften the plastic strip 21 and retain it in the desired cone shape, i.e. so as to be plasticised in the desired cone shape. Subsequently, a waterproof paste is applied to an outside surface of the tail 2. It should be noted that the hollow inner shell 11 is also formed in a similar manner as mentioned above.

The weight of the fishing float in accordance with the present invention is less than that of the prior art. Therefore, the float has more sensitivity to move up and down on water's surface thereby making it easier for an angler to determine when a fish is biting the bait. Moreover, the spiraled construction of the tail 1 and the inner shell 11 creates a stronger structure with high flexibility and is capable of enduring an accidental impact or bending force in comparison with the conventional fishing float.

The fishing float is shown in FIGS. 5 and 6 in an extended and a retracted condition respectively. In FIG. 5, the inner shell 11 is pulled out a substantial distance with respect to the outer shell 12. Thus, the airtight space has a larger capacity compared with that under a retracted condition as seen in FIG. 6. Different air capacities will obtain different buoyancies in water, in other words, an angler is able to control the level that the fishing float will float on the water's surface according to his/her preference.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A fishing float comprising a spindle at an upper portion, a bob at a middle portion and a tail at a lower portion thereof, characterized in that:

said bob comprising a hollow inner shell enclosed by a hollow outer shell;

said outer shell being a substantially cylindrical shape with a bulbous section on a top portion thereof, a small opening projecting from a top end and said outer shell containing a rubber grommet for receiving a lower end of said spindle therein;

said inner shell being inserted into an opening at a lower end of said outer shell and being extensible with respect to said outer shell;

said inner shell being a substantially cylindrical shape and a circular rubber plug being disposed on a top end thereof, said circuit rubber plug contacting closely with an inner surface of said outer shell and provides a snug water tight fit, a scale also being provided on an outer surface of said inner shell; and said tail being attached to a lower aperture of said inner shell.

2. A fishing float as claimed in claim 1, wherein said tail and said inner shell are constructed from a thin tapered plastic strip being tightly spiraled and then dipped into hot water so as to be plasticised in a desired shape, said tail and said inner shell then being coated with a waterproof paste.

* * * * *